United States Patent                                                             [11] 3,570,647

| [72] | Inventors | Robert L. Meikle; |
|---|---|---|
| | | George E. Watkins, Painted Post, N.Y. |
| [21] | Appl. No. | 833,114 |
| [22] | Filed | June 13, 1969 |
| [45] | Patented | Mar. 16, 1971 |
| [73] | Assignee | Corning Glass Works |
| | | Corning, N.Y. |

[54] LOADING APPARATUS
4 Claims, 13 Drawing Figs.

| [52] | U.S. Cl. | 198/24 |
|---|---|---|
| [51] | Int. Cl. | B65g 47/52 |
| [50] | Field of Search | 198/24, 31 |
| | | (A2), 144, 169; 214/1 (B2) |

[56] References Cited
UNITED STATES PATENTS
1,760,030    5/1930    Alger........................... 11/1

| 2,245,694 | 6/1941 | Lindholm | 198/24 |
|---|---|---|---|
| 3,184,031 | 5/1965 | Dunlap | 198/24 |

*Primary Examiner*—Evon C. Blunk
*Assistant Examiner*—W. Scott Carson
*Attorneys*—Clarence R. Patty, Jr. and Charles W. Gregg ABSTRACT: Apparatus for loading two at a time workpieces or articles such as tubes or rods of substantially identical diameters and lengths into chucks carried on a pair of spaced apart and vertical turrets which intermittently move or index the workpieces or articles through a vertically circular path of travel including a series of stations at which work such as end-forming is performed on the workpieces. Apparatus provides for said loading of the workpieces or articles at a substantially higher speed than heretofore attainable by loading apparatus used for similar purposes.

PATENTED MAR 16 1971

INVENTORS.
Robert L. Meikle
George E. Watkins
BY
Charles W. Gregg
AGENT

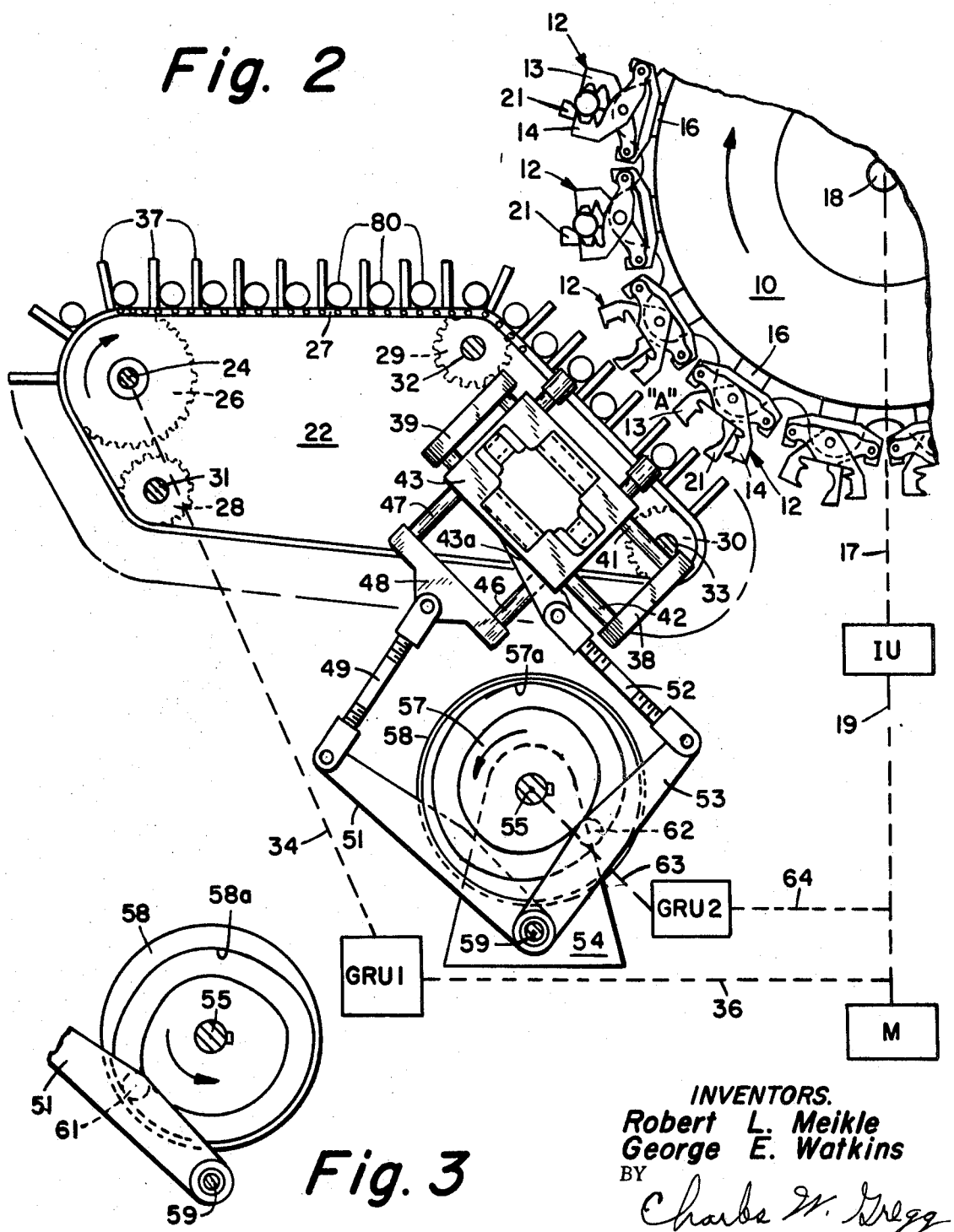

INVENTORS.
Robert L. Meikle
George E. Watkins
BY
Charles W. Gregg
AGENT

LOADING APPARATUS

BACKGROUND OF THE INVENTION

Recent improvements in the forming of glass tubing, or rod, and in the cutting thereof to desired lengths, have greatly increased the speed of production of cut lengths of such rod or tubing. Such articles or cut lengths of tubing or rod are usually subjected, following the cutting thereof into desired lengths to additional forming operations, such as, for example, end-forming of lengths of tubing to be used for the manufacture of fluorescent lamps. Such end-forming operations are often performed while the workpieces or articles are carried by a pair of spaced-apart turrets which intermittently move or are indexed through vertically circular paths of travel and move the ends of the articles or lengths of tubing through corresponding paths for the forming operations to be performed on the ends of the articles.

In order to take full advantage of said increase in speed of the forming and cutting of said lengths of tubing, it is desirable that the speed of said end-forming operations be correspondingly increased and, in order to accomplish such increase in speed, it is necessary to increase the speed with which said turrets are intermittently indexed through their said vertical paths of travel. However, such an increase in velocity also requires that said turrets can be loaded at a corresponding increase in speed, as is believed readily apparent. The apparatus of the present invention was, therefore, conceived and developed in order to attain an increase in speed in the handling of said articles or workpieces, and in the loading of turrets, such as those discussed, with such articles or workpieces.

SUMMARY OF THE INVENTION

In practicing the present invention, there is provided an apparatus which pushes articles or workpieces of the class mentioned, two at a time, into article receiving chucks carried on a pair of turrets such as hereinbefore discussed. Corresponding pairs of such chucks on each said turret are positioned or intermittently indexed, for receipt therein of a pair of said articles, to a loading station located in a lower quadrant of the vertical paths of rotation of said turrets.

BRIEF DESCRIPTION OF THE DRAWINGS

FIG. 2 is an elevational view of the apparatus of FIG. 1, such view being taken generally along line 2—2 of FIG. 1;

FIG. 3 is a detailed view of part of the apparatus of FIG. 2 and illustrates the shape or configuration of a cam employed in the apparatus of the invention;

Similar reference characters refer to similar parts in each of the FIGS. of the drawings.

DESCRIPTION OF THE PREFERRED EMBODIMENT

Figure 1:
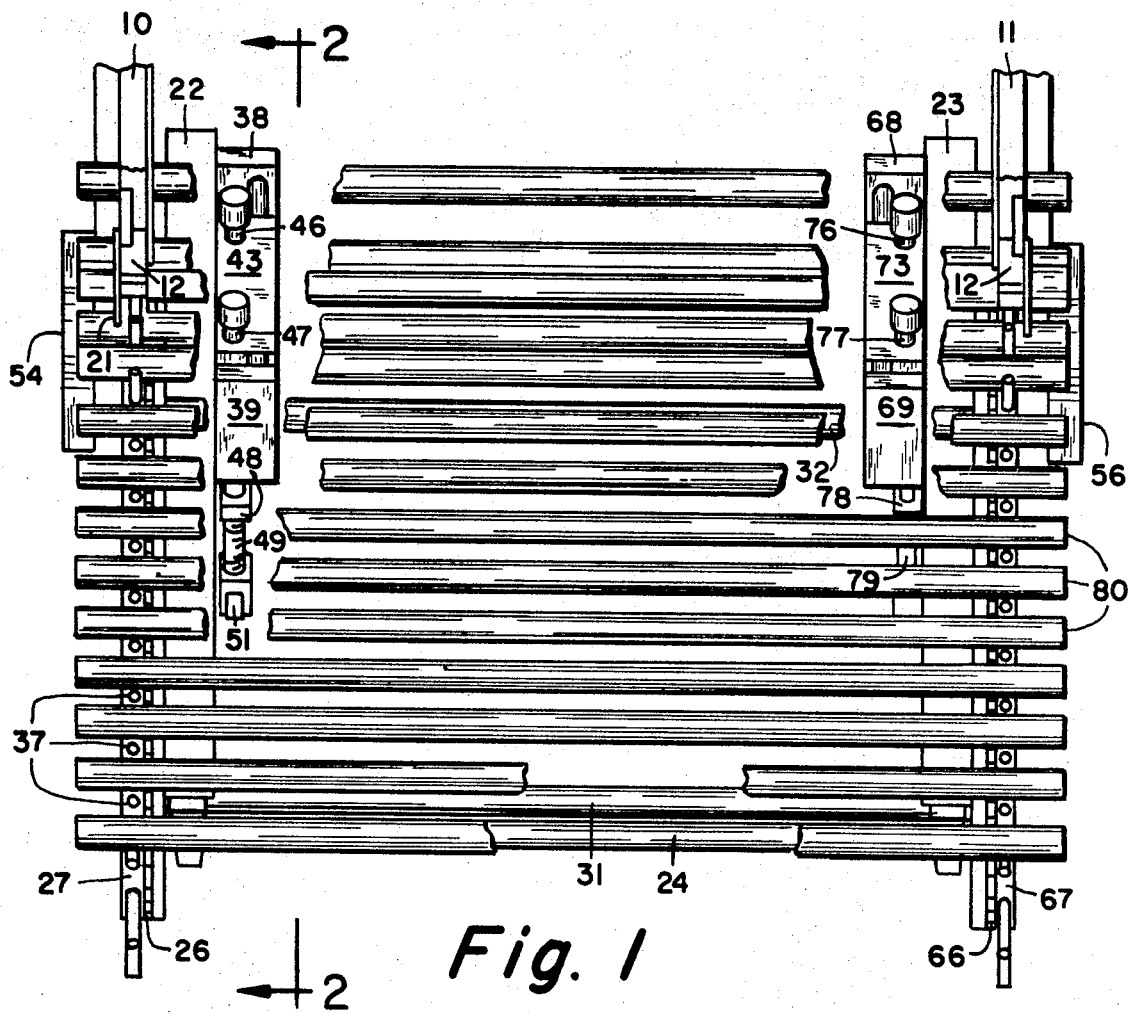
FIG. 1 of the drawings is a top plan view of part of the apparatus embodying the invention.

Referring to FIGS. 1 and 2 of the drawings, there is shown a pair of vertically oriented turrets 10 and 11, which are horizontally spaced apart from each other a distance chosen in accordance with the length of the articles or workpieces, such as the previously mentioned lengths of rod or tubing, which are to be loaded onto said turrets. Turrets 10 and 11 carry about the outer peripheries thereof a plurality of evenly spaced-apart article or workpiece supporting chucks such as 12, each of which comprises a pair of jaws such as 13 and 14, which are actuable between an open condition for receipt therebetween of the peripheries of said workpieces or articles and a closed condition in which said peripheries are clamped between the jaws of the respective chucks. Each of such pairs of jaws is actuated between said open and closed conditions by an associated actuating member such as 16 (FIG. 2) which is actuated outwardly and inwardly away from and towards the center of its respective turret such as 10 and 11 to open and close, respectively, the jaws of the respective chuck.

Turrets 10 and 11 further have associated therewith an indexing unit IU which is connected, as indicated by the dotted line 17 in FIG. 2, to the axle or shaft 18 on which turrets 10 and 11 are mounted for rotation thereof. A motor or prime mover M has its output connected to indexing unit IU, as indicated by the dotted line 19, and such motor provides the power for intermittently driving turrets 10 and 11 in a clockwise direction as indicated by the arrow on turret 10 in FIG. 2, and through their vertically circular paths of travel previously mentioned and as hereinafter further discussed in an operational example of the invention.

It is believed expedient to point out at this point in the description that turrets such as 10 and 11 and their associated chucks such as 12, indexing units such as IU and, of course, motors or prime movers such as M, are all old and well known in the art and such components, per se, form no part of the present invention. Furthermore, the manner of connecting components such as indexing unit IU and motor M to the turrets for the intermittent indexing of the turrets is well known and, therefore, is shown in FIG. 2 only diagrammatically.

As further illustrated in FIG. 2, associated pairs of chucks, such as 12, are intermittently indexed by their respective turrets to a loading station designated by the letter A disposed at approximately the center of the loading station. Such station extends on each side of such center so as to include the space between first and second ones of the chucks which are shown in FIG. 2 as dwelling immediately to the left and above, and to the right and below said letter A in FIG. 2. Upon each succeeding indexing cycle of turret 10, the next successive pair of chucks on such turret will be moved to the loading station with the first and second chucks of each such next pair thereof occupying the positions vacated by said first and second chucks shown positioned at the loading station in FIG. 2. It is pointed out that loading station A is located (when viewing FIG. 2) in the lower left-hand quadrant of the path of intermittent vertical rotation of turret 10. Although believed obvious, it is also pointed out that turret 11 intermittently moves its associated pairs of chucks in a manner corresponding to that just described for turret 10, and that loading station A extends laterally horizontal to include a portion of a lower quadrant of the path of vertical rotation of turret 11, such lower quadrant corresponding to that just discussed for turret 10. Since turret 11 is arranged correspondingly to turret 10, complete details of turret 11 are not shown in the drawings for purpose of simplification thereof.

Turrets 10 and 11 further include article guide members such as 21 which are associated with each chuck such as 12 and which direct or guide the articles into their respective carrying chucks when such articles are being pushed or loaded therein. This will become more apparent hereinafter in an operational example of the invention.

First and second support plates 22 and 23 are associated with turrets 10 and 11, respectively, and are mounted in any convenient manner adjacent to their respectively associated turrets as best illustrated in relationship with turret 10 in FIG. 2. A first axle or drive shaft 24 extends between support plates 22 and 23 and there is mounted thereon, in a rotatable relationship therewith, a sprocket wheel 26 (FIG. 2) about which is looped an endless conveyor or chain 27 in a driven relationship with sprocket 26. Conveyor 27 further extends about first and second idler sprocket wheels 28 and 29 which are mounted on axles or shafts 31 and 32, respectively, and are freely rotatable on their respective shafts. Axles or shafts 31 and 32 also extend between support plates 22 and 23 and, together with shaft 24, provide members which keep such plates spaced apart from each other a selected distance as shown in FIG. 1. A third idler sprocket wheel 30 is rotatively supported on a short axle or shaft 33 which is mounted on support plate 22 and wheel 30 is freely rotatable on such axle or shaft. Said conveyor 27 is also looped about sprocket wheel 30. Sprocket wheels 26, 28, 29, and 30 are shown in broken lines in FIG. 2, since they are positioned behind support plate 22 in such drawing FIG.

By the arrangement just described, it will be apparent that conveyor or chain 27 extends in an endless loop about sprocket wheels 26, 28, 29, and 30 and that driven rotation of shaft or axle 24 will impart a corresponding movement to conveyor or chain 27 through a vertical looped path of travel a selected portion of which extends through loading station A parallel with a line projected between the centers of a pair of chucks such as 12 positioned at such loading station.

For purposes of rotatively driving shaft 24, there is provided a gear reduction unit GRU1 whose output is connected to shaft 24, as indicated by the dotted line 34 in FIG. 2, and whose input is connected to the output of motor or prime mover M, as indicated by the dotted line 36 in FIG. 2. When power is supplied to unit GRU1 from motor M, such unit drives shaft 24 in a clockwise direction as indicated by the arrow on sprocket wheel 26 and, as hereinafter further discussed, conveyor 27 is continuously moved through its said path of travel at a speed selected in accordance with the time periods of the indexing cycles of turret 10.

Chain or conveyor 27 is provided on its outer periphery with a succession of fingers such as 37, which extend generally normal to the outer surface of such periphery. Such succession of fingers extends entirely around conveyor 27 and provide pockets in which the articles to be loaded into the chucks, such as 12, on the turrets, such as 10 and 11, are conveyed into loading zone A. Each such pocket must, of course, have a width slightly wider than the diameter of the largest articles or workpieces to be handled by the apparatus and, for purposes hereinafter discussed in detail, the centers of the jaws of each associated pair of chucks, such as 12, positioned at the loading station by a turret, such as 10, must be separated a distance generally equal to three times the distance between the centers of adjacent or successive ones of said pockets. In other words, the centers of adjacent ones of said pockets are separated by a distance substantially equal to one third of the distance between the centers of the jaws of associated pairs of chucks such as 12 carried on the turret such as 10. This will be made more apparent as the description proceeds.

There is also mounted on or affixed to support plate 22, in any convenient manner, a pair of support members 38 and 39, between which extend, in a parallel relationship with each other, a pair of rods 41 and 42 which provide a slide track for an article or workpiece pusher carriage 43 which is slidably movable, along such rods or slide track, in a direction extending parallel with said selected portion of the path of travel of chain or conveyor 27. A pair of workpiece or article pushers 46 and 47 extend snugly but slidably through carriage 43 in a direction normal to said selected portion of the path of travel or conveyor 27. Such pushers extend generally parallel with each other with the centers of the article-contacting ends of the pushers being separated or spaced apart a distance substantially equal to said distance between the centers of the jaws of adjacent chucks such as 12 carried on turret 10. The centers of said ends of the pushers are, therefore, also separated a distance generally equal to three times the distance between the centers of successive ones of the previously mentioned pockets on conveyor 27.

Referring further to FIG. 2, article pushers 46 and 47 connect at their lower ends to a yoke member 48 which is pivotally connected to the upper forked end of an adjustable connecting rod 49. The lower forked end of rod 49 is pivotally connected to one end of a lever arm 51 to be discussed in detail hereinafter.

Workpiece pusher carriage 43 has a downwardly extending lug portion 43a to which is pivotally connected the upper forked end of an adjustable connecting rod 52. The lower forked end of rod 52 is pivotally connected to one end of a lever arm 53 also to be discussed hereinafter.

An upright support member 54 rests on the floor or on a suitable platform (not shown) and one end of an axle or shaft 55 extends through such support member near the upper end of such member and in a rotatable relationship therein. The other end of shaft or axle 55 extends through a second support member 56 (FIG. 1) which is similar to support member 54, and shaft or axle 55 is rotatable within member 56. A first cam 57 is mounted on shaft or axle 55 and is keyed thereto for driven rotation therewith. A second cam 58 (as best shown in FIG. 3) is also mounted on shaft or axle 55 and is also keyed thereto for driven rotation therewith.

The second ends of lever arms 51 and 53 are pivotally connected to support member 54 as by a short axle or shaft 59 which extends through such second ends and is secured to said support member. A cam follower 61 is pivotally mounted on lever 51 (FIGS. 2 and 3) near the center of such lever and extends into cam track or groove 58a on cam 58 in the usual manner. A cam follower 62 is pivotally mounted on lever 53 near the center of such lever and extends into cam track or groove 57a on cam 57 in the usual manner.

As indicated by the dotted line 63, axle or shaft 55, on which cams 57 and 58 are mounted, is connected to the output of a gear reduction unit GRU2. The input of unit GRU2 is, as indicated, by the dotted line 64, connected to the output of motor or prime mover M. When power is supplied from motor M to unit GRU2, axle or shaft 55 is driven to rotate cams 57 and 58 counterclockwise as indicated by the arrows on the faces of the cams. During such rotation of cams 57 and 58, cam followers 61 and 62 follow their respectively associated cam tracks 58a and 57a to actuate levers 51 and 53, respectively, and thereby impart motion to pusher carriage 53, and to article pushers 46 and 47, for purposes hereinafter discussed.

It is expedient to point out at this point in the description that apparatus which is a mirror image of that just discussed is mounted on or supported by support plate 23 and upright support 56. As shown in FIG. 1, such apparatus includes a sprocket wheel 66, a conveyor 67, support members 68 and 69, workpiece or article pusher carriage 73, article pushers 76 and 77, yoke member 78, and connecting rod 79, such components corresponding, respectively, to sprocket wheel 26, conveyor 27, support members 38 and 39, article pusher carriage 43, article pushers 46 and 47, yoke member 48 and connecting rod 49. However, no connections, such as indicated by the dotted lines 17, 19, 34, 36, 63, and 64 in FIG. 2, need be made to the apparatus mounted on or supported by support plate 23 and upright support 56 since a single connection to each of the axles 18, 24 and 55 to supply power thereto from motor M for rotation of such axles will suffice.

Figure 4:
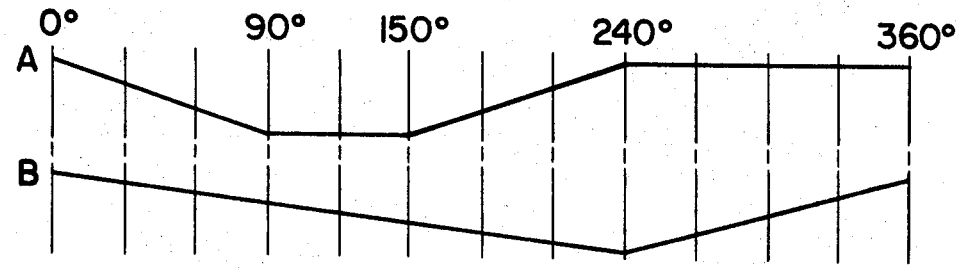
FIG. 4 comprises a chart illustrating the sequence of movement of certain parts of the apparatus of the invention.

Referring to FIG. 4, the relationship between the rotation of face cams 57 and 58 and the apparatus actuated by each cam will be briefly and generally discussed. It will be noted that the chart of FIG. 4 represents an expanse from 0° to 360° and, therefore, represents a full revolution of each of the cams 57 and 58. The chart is marked off or graduated in steps of 30° each, and the 0° and 360° mark are to be considered the same mark, that is, the beginning and end of a full revolution of said cams. Curve A on the chart, as discussed below, indicates movement of the article pushers, such as 46 and 47, in carriage 43 during one full revolution of cam 58, and curve B on the chart indicates movement of the article pusher carriage such as 43 during an identical revolution of cam 57. Thus, the chart indicates the movements and dwell periods of said components in relationship to each other.

Figure 13:
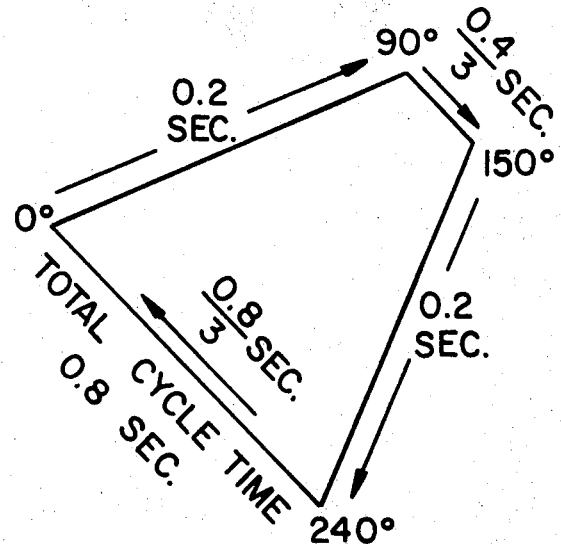
FIG. 13 comprises a diagram illustrating the path of movement of parts of the apparatus of the invention.

Referring to FIG. 13, there is shown, as previously mentioned, a diagram illustrating the path of movement of parts of the apparatus of the invention. More specifically, the diagram of FIG. 13 illustrates the path of movement of a selected point on either one of the article pushers, such as 46 and 47, during a complete revolution of cams 57 and 58. Since the movement of the article contacting ends of the article pushers is the important consideration, it will be assumed that the diagram of FIG. 13 illustrates the path of movement of the center of the article contacting end of either selected one of the article pushers 46 and 47.

It will be noted that the diagram of FIG. 13 is marked in degrees similarly to the chart of FIG. 4, that is, at the 0°, 90°, 150°, 240°, and the 0° (360°) positions. Time periods are also shown on the diagram of FIG. 13 but these will be discussed hereinafter in an operational example of the inventions.

Considering the chart of FIG. 4, in conjunction with the diagram of FIG. 13 and starting at the 0° position on both the chart and the diagram, during the first 90° of a revolution of cams 57 and 58, said center point on the article contacting end of said selected pusher moves in two directions simultaneously and, therefore, moves through the straight-line path from 0° to 90° shown on the diagram of FIG. 13. During the next 60° of said revolution of cams, said selected point moves in a single direction under the actuation of carriage 43, by cam 57 (curve B of the chart) and, therefore, said point moves through the straight-line path from 90° to 150° shown on the diagram of FIG. 13. During the next 90° of said revolution of cams 57 and 58, said selected point again moves in two directions simultaneously to follow the path from 150° to 240° shown on said diagram. During the next 120° of revolution of the cams, said selected point again moves in a single direction under the actuation of carriage 43 by cam 57 (curve B of the chart) and, thus, said point moves through the straight-line path from 240° to 0° (360°) shown on the diagram of FIG. 13.

Prior to setting forth a brief operational example of the invention, it is believed that it will be well to set forth one detailed example of certain specific dimensions and time or speed relationships which can be employed in the apparatus of the invention. However, it is pointed out that such specific dimensions and speeds are not to be considered in any way limiting but that apparatus embodying the invention can be constructed with dimensions other than those set forth and operated at speeds other than those specifically described in the detail example.

It will be assumed that it is desired that the articles handled will be loaded two at a time, at a rate of 150 articles per minute. To accomplish such objective the articles must be loaded, two at a time, at a rate of two articles each 0.8 of a second. Therefore, each indexing cycle of the turrets such as 10 and 11, including a dwell period of a pair of associated chucks at loading station A and a period of movement of such chucks away from such station while simultaneously moving the next succeeding pair of chucks to said station for loading thereof, must be of a total maximum duration of 0.8 second. It will be further assumed that the articles to be loaded are lengths of tubing which have a maximum outside diameter of 1.5 inches. Under such conditions the centers of the previously mentioned pockets provided by the fingers such as 37 on the conveyor such as 27, are spaced from each other a distance of 2 inches and said fingers, such as 37, can be approximately 0.25 inch in thickness. With such dimensions said articles can readily be deposited in said pockets and unloaded therefrom.

Under the above assumed conditions, the centers of the pairs of jaws of each pair of associated chucks, such as 12, positioned at loading station A are spaced from each other a distance of 6 inches, or three times the distance between the centers of adjacent ones of said pockets on conveyor 27. As previously mentioned, the time period of one indexing cycle of the turrets 10 and 11 is assumed to be 0.8 second. Such cycle is divided into a dwell period of ⅔ of 0.8 second, that is, 1.6/3 second during which a pair of associated chucks such as 12 dwell at the loading station, and an indexing period of ⅓ of 0.8 second, that is, 0.8/3 second during which a loaded pair of associated chucks are moved from the loading station and an empty pair of associated chucks are moved to the loading station for receipt of a pair of articles to be loaded therein. Thus, a pair of articles carried on conveyors 27 and 67, and which are to be loaded into a pair of associated chucks positioned at the loading station, must be so loaded in a maximum of 1.6/3 second, that is, during the period that said pair of chucks dwell at the loading station. However, as hereinafter further pointed out, time must also be allowed for the uppermost article pushers such as 47 and 77 (FIGS. 1 and 2) to be actuated to their retracted positions in carriage 43. This is necessary so that such pushers will not be in the path of movement of the next article to be moved to the loading station by the conveyors 27 and 67. Accordingly, each pair of articles to be loaded into a pair of associated chucks positioned at the loading station are so loaded in a time period of 1.0/3, that is, one third of a second which includes a period of dwell of the article pushers in their extended positions. Thus, following such dwell period 0.6/3 second, that is 0.2 second remains for actuation of the article pushers to their retracted positions.

Since the indexing cycles of the turrets such as 10 and 11 comprise a period of 0.8 second, the conveyors 27 and 67 must move at a speed or velocity of 4 inches in 0.8 second. This is necessary in order that pairs of articles to be loaded into the chucks on turrets 10 and 11 always correspondingly pass through the loading station and correspondingly approach the chucks positioned at such station for loading thereof. Also due to said 0.8 second indexing cycles, the pairs of article pushers such as 46 and 47 must complete a cycle of their movement in a corresponding period of time, that is, 0.8 second in order that they will have returned to the initial position of each such cycle of movement in time for the start of the next succeeding cycle of movement. This will be readily apparent to those skilled in the art.

Referring now to FIGS. 5 through 12, taken in conjunction with FIGS. 1 through 4, and FIG. 13, a brief operational example of the invention will be given. For purposes of such example the previously discussed dimensions and timing cycles will be used and, therefore, it will be assumed that the conveyors such as 27 and 67 continuously moving through their paths of travel at a velocity of 4 inches per 0.8 second.

As best shown in FIG. 1, a succession of similar longitudinal articles such as 80 and which may, for example, be lengths of tubing having equal diameters and substantially equal lengths, are being carried by conveyors 27 and 67 towards the turrets 10 and 11. Such articles rest in corresponding pockets on conveyors 27 and 67 as shown in FIG. 1 and in a manner which is obvious from a brief glance at such drawing FIG. The apparatus for delivering said articles to the successive pockets on the conveyors is not shown since it forms no part of the present invention. However, such apparatus may, for example, comprise a pair of spaced-apart conveyors similar to conveyors 27 and 67 shown in the drawings. When such a delivery apparatus is employed, the exit or article delivery end thereof is preferably disposed directly above an article receiving end (left-hand end when viewing FIG. 2) of the path of movement of conveyors 27 and 67, as is believed obvious.

Figure 5:
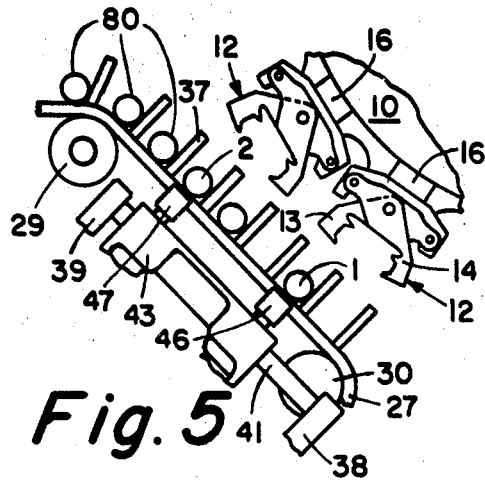
FIGS. 5 through 12 comprise schematic views illustrating motion of parts of the apparatus embodying the invention.

Referring to FIG. 5 of the drawings taken in conjunction with FIG. 2, the correspondence between the apparatus shown somewhat schematically in FIGS. 5 through 12 and the apparatus of FIG. 2 will be readily apparent from the reference characters included in FIG. 5. Therefore, for purposes of simplification of the drawings, complete sets of reference characters are not included in FIGS. 6 through 12.

Figure 6:
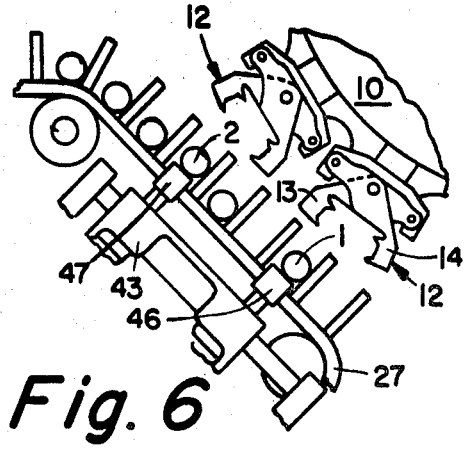
Figure 7:
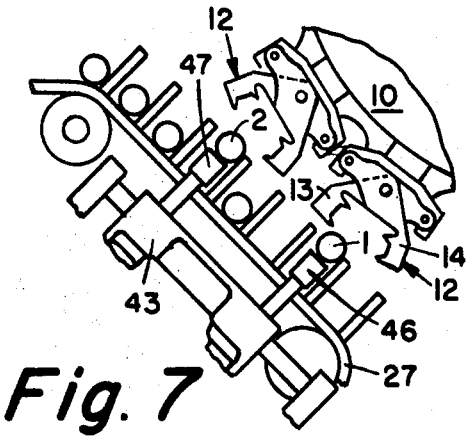

FIG. 5 illustrates the apparatus of the invention immediately following the indexing by turret 10 of a pair of associated chucks, such as 12, to the loading station A in FIG. 2. At such time, carriage 43 is in its uppermost position on its slide track including rods 41 and 42, and article pushers 46 and 47 are in their fully retracted positions within carriage 43. Conveyor 27 is, as previously mentioned, moving at a speed of 4 inches per 0.8 second. Referring to FIG. 6, immediately following the arrival of said chucks at the loading station, carriage 43 starts to move downwardly on its said slide track at a speed equal to the speed of movement of conveyor 27 through its path of travel. Simultaneously, pushers 46 and 47 are moved upwardly towards their projected or extended article loading positions and thereby contact a pair of articles designated 1 and 2 which are to be loaded into said chucks. FIG. 7 illustrates further downward movement of carriage 43, and further extended movement of pushers 46 and 47 which raises the articles 1 and 2 in their respective pockets on conveyor 27 and towards the jaws of the chucks such as 12.

Figure 8:
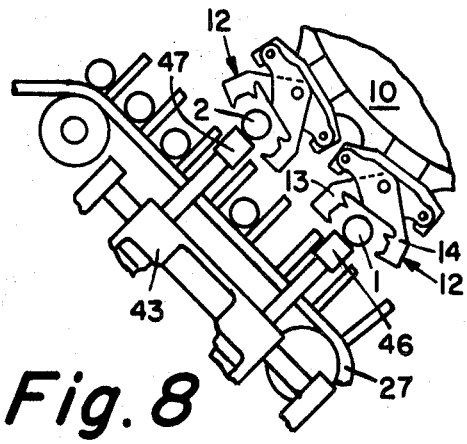
Figure 9:
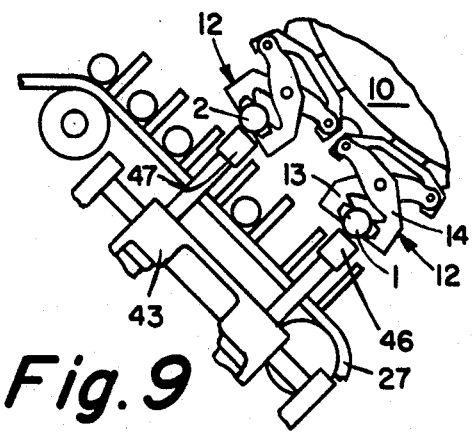
Figure 10:
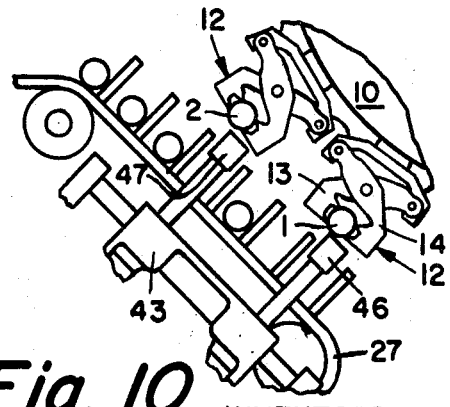

In FIG. 8, articles 1 and 2 have, by the completion of the extended movement of pushers 46 and 47, been pushed into the centers of the jaws of said chucks. During such further movement carriage 43 moves further downwardly to follow the movement of conveyor 27. Following the completion of the movement of pushers 46 and 47 to their fully extended or projected positions shown in FIG. 8, such pushers remain in their extended or projected positions for a brief dwell period to permit articles 1 and 2 to be longitudinally centered in the corresponding chucks of turrets 10 and 11 and, thereafter, the jaws of the chucks to close against the outer peripheries of the articles as shown in FIG. 9. During such dwell period, carriage 43 continues to move downwardly at a velocity corresponding to that of conveyor 27 and, at the end of the dwell period, the apparatus is in the positions, illustrated in FIG. 10. The actuation of the article pushers to their retracted positions is now initiated. Referring to FIG. 13, it is pointed out that the path of movement of the article pushers to their fully extended or projected positions is represented by the line extending between 0° and 90° on the diagram of FIG. 13, while the dwell period of said pushers in their fully extended or projected positions is represented by the line extending between 90° and 150° on said diagram. Reference is also made to FIG. 4 for illustration of the rotation of cams 57 and 58 through 150° of one revolution of such cams.

Figure 11:
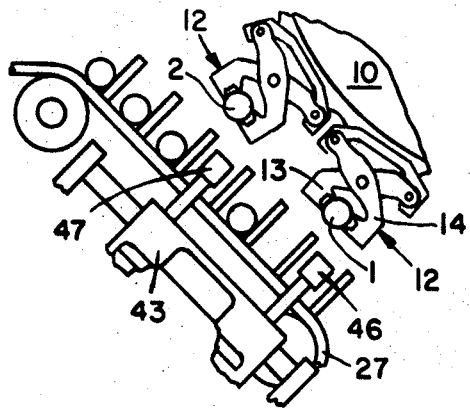
Figure 12:
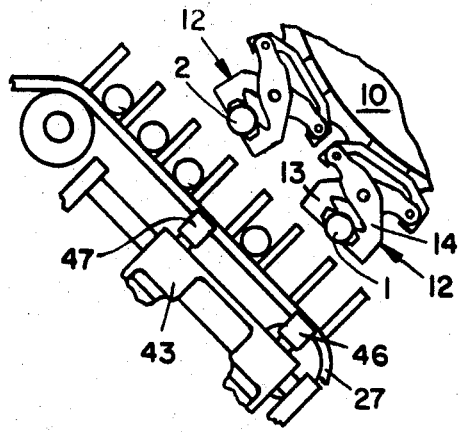

FIG. 11 illustrates actuation of the article pushers towards their retracted positions while carriage 43 has moved even further downwardly. FIG. 12 shows carriage 43 at the lowermost end of its path of travel and the article pushers in their fully retracted positions. In the diagram of FIG. 13, such movement of the article pushers is represented by the line extending from 150° to 240°.

Immediately following the actuation of the apparatus to the positions shown in FIG. 12, an indexing cycle of turret 10 is initiated and movement of carriage 43 to the uppermost end of its path of travel is simultaneously initiated. The path of movement of the article pushers during such movement of carriage 43 is represented by the line extending between 240° and 0° (360°) in the diagram of FIG. 13. Subsequent to such movement, the apparatus is back in the positions illustrated in FIG. 5 and a new cycle of actuations of the apparatus for loading another pair of articles into the pairs of empty chucks then at the loading station starts.

In an apparatus such as that shown in the drawings and having the dimensions and time cycles such as those previously discussed, the distance that carriage 43 moves between its uppermost and lowermost positions may be, for example, 2⅔ inches. Since carriage 43 moves downwardly at a speed equal to the conveyor, such as 27, such carriage must move downwardly through said 2⅔ inches of travel in 1.6/3 second, that is, in 0.5⅓ second which is a speed of 2 inches per 0.4 second or a speed equal to that of conveyor 27. The period of time for one cycle of the apparatus being, as previously mentioned, 0.8 second, carriage 43 must return to its uppermost position in 0.8/3 second, that is, 0.2⅔ second so that another cycle of the apparatus can be started. The length of lever 53 and the configuration of the cam track 57a in cam 57 are, therefore, such that carriage 43 is reciprocatively moved through said distance in the time periods stated. Reference is made to curve B of FIG. 4 for an understanding of the configuration of cam track 57a in cam 57.

Under the same considerations as mentioned above, the distance that article pushers 46 and 47 move between their retracted and extended or projected positions in carriage 43 may, for example, be 2.5 inches. Since such article pushers dwell in their extended positions for a period of time as previously mentioned and, since the pushers must move from their retracted positions to their extended or projected positions and return to their retracted positions in a period of time equal to the period of dwell of a pair of chucks at the loading station, that is, for a period of 1.6/3 second, the configuration of cam track 58a in cam 58 and the length of lever 51 are such that the article pushers move from their retracted positions to their extended positions (2.5 inches) in 0.2 second, such pushers dwell in their extended positions for a period of 0.4/3 second, that is, 0.1⅓ second, and the pushers and return (2.5 inches) to their retracted positions in 0.2 second. Reference is made to curve A of FIG. 4 for an understanding of the configuration of cam track 58a in cam 58.

If further information relating to the time periods of operation of carriage 43 and of the article pushers such as 46 and 47 is desired, reference is made to FIG. 13 which gives the time periods of the movements of such components.

Although it is believed to be readily apparent from a brief study of FIG. 1, and of FIGS. 5 through 12, it is pointed out that, of a succession of consecutively numbered ones of said pockets carried by a conveyor such as 27, the odd-numbered pockets are always unloaded by a first of a pair of the article pushers such as 46 and 47, while the even-numbered pockets are always unloaded by the second of such pair of pushers.

Apparatus heretofore employed for the purpose of loading a pair of turrets, such as turrets 10 and 11 shown in FIG. 1 of the present application, employs conveyors which are intermittently indexed to move a succession of articles, one at a time, to a loading station for loading of the articles, one at a time, into chucks positioned by said turrets at said station. The maximum speed at which said articles can be loaded by such an apparatus is on the order of 75 to 100 articles per minute due to the intermittent operation of the conveyors of the apparatus. As described herein, the apparatus of the present invention can load articles at a speed of approximately 150 articles per minute. This is due to the driving of the conveyors at a continuous rate of speed and the use of pairs of article pushers which follow the movement of the conveyors while being reciprocatively actuated to load the articles, two at a time, into the pairs of associated chucks positioned at the loading station by the turrets such as 10 and 11.

We claim:

1. In combination with a pair of horizontally spaced apart, corresponding and vertically rotatable turrets each carrying about its outer periphery a corresponding plurality of pairs of adjacent and associated workpiece chucks which are equally spaced apart about the outer periphery of each respective turret and which are indexed in unison by said turrets through vertically circular and corresponding paths of travel comprising a series of stations including a loading station located in a selected lower quadrant of said paths of travel and at which said pairs of associated chucks are successively positioned for receipt therein of opposite ends of pairs of a series of longitudinal workpieces such as similar lengths of rod or tubing, an apparatus associated with said turrets for loading of said pairs of workpieces into said pairs of chucks, such apparatus comprising:

A. an endless workpiece conveyor associated with each said turret, each such conveyor movable through a vertical loop path of travel a portion of each of which extends parallel with and downwardly past said loading station, each such conveyor also including on the outer periphery thereof an endless succession of workpiece pockets whose centers are spaced apart a distance equal to a third of the distance between the centers of adjacent ones of said chucks on said turrets;

B. workpiece pusher means associated with each said conveyor and each located below and adjacent to said portion of the vertical loop path of travel of the respectively associated conveyor, such pusher means each including a pair of pusher members which are spaced apart a distance equal to the distance between the centers of adjacent ones of said chucks on said turrets and which have workpiece contacting ends which face normal to said portion of said loop path of travel of the respectively associated conveyor;

C. means associated with each said workpiece pusher means for supporting the respectively associated pusher means in its respective said location, each such supporting means so supporting its respective pusher means for first reciprocative movement of said ends of said pusher members parallel with said portion of said loop path of travel of the respectively associated conveyor and for second reciprocative movement of said ends of said pusher members normal to a line projected between the centers of each of said pairs of adjacent and associated workpiece chucks which each respective pair of such chucks are positioned at said loading station;

D. means for moving each said conveyor through its said path of travel at a constant speed and a speed such that odd and even-numbered pockets of consecutively numbered pockets on each respective conveyor are aligned with the centers of each of said pairs of associated chucks at some point in time during the dwell period of each such pair at said loading station;

E. means for imparting said first reciprocative movement to each said pusher means at a first speed and in a direction corresponding to the speed and direction of movement of each respectively associated conveyor, and at a second speed and in a direction corresponding to twice the conveyor speed and opposite the direction of movement of the respectively associated conveyor, the total time of movement of each said pusher means in both directions being equal to the time of movement past any selected point of any two successive ones of said pockets on said conveyors; and F. means for imparting said second reciprocative movement to each said pusher means for actuation of said pusher members between retracted and projected positions with a brief period of dwell at said projected position, the total time of said actuations and said dwell period being equal to the time of movement of said pusher means in said first direction of said first reciprocative movement of such means.

2. In combination with first and second horizontally spaced apart, corresponding and vertically rotatable turrets each carrying about its outer periphery a corresponding plurality of pairs of associated and adjacent workpiece chucks which are equally spaced apart about the outer periphery of each respective turret and which are indexed in unison by said turrets through vertically circular corresponding paths of travel comprising a series of stations including a loading station located in a selected lower quadrant of said paths of travel and at which said associated pairs of chucks are successively positioned for receipt therein of opposite ends of pairs of a series of longitudinal workpieces such as similar lengths of rod or tubing, apparatuses associated with said turrets for loading of said pairs of chucks, such apparatuses comprising:

A. a first apparatus associated with said first turret, such first apparatus including;

a. an endless article conveyor movable through a vertical loop path of travel including a selected portion extending parallel with lines projected between the centers of each of said pairs of adjacent and associated chucks when each such pair is positioned at said loading station, such conveyor including about the outer periphery thereof an endless succession of workpiece conveying pockets which are closely adjacent to the outer limit of said circular path of travel of said chucks when such pockets are moved by the conveyor through said selected portion of said path of travel of the conveyor and past said loading station, each said pocket having a width greater than the diameter of said workpieces and the centers of adjacent ones of said pockets being spaced from each other a distance generally corresponding to one third of the distance between the centers of adjacent pairs of said chucks; and b. means for supporting a pair of similar workpiece pushers adjacent the lower side of said conveyor with the workpiece-contacting ends of such pushers pointed towards said selected portion of said path of travel, the centers of such ends of the pushers being spaced apart a distance generally equal to the distance between the centers of adjacent ones of said chucks, said pushers being reciprocatively movable on said supporting means through a first path of travel including projected and retracted positions towards and away from the centers of a pair of said chucks when located at said loading station and in a direction normal to a centerline projected between such centers, said pushers also being reciprocatively movable on said supporting means through a second path of travel in which said ends of the pushers parallel said selected portion of said path of travel of said conveyor;

B. a second apparatus associated with said second turret and including second components corresponding to the components set forth for said first apparatus;

C. means for continuously driving the conveyors for said first and second apparatuses so that they move downwardly through the selected portions of their respective vertical loop paths of travel and past the loading station at a velocity equal to one third of the average velocity of one indexing cycle of said turrets, such driving means also driving said conveyors in a time relationship with the indexing cycles of said turrets such that, during the portion of each such indexing cycle that a pair of said associated chucks on each said turret are positioned at said loading station for receipt from the conveyors of a pair of workpieces, the pockets on the conveyors move past said loading station so that workpieces carried in odd and even-numbered ones of consecutively numbered ones of said pockets may be loaded by the workpiece pushers, prior to the start of the next indexing cycle of said turrets, into corresponding first and second chucks of the pairs of chucks positioned at the loading station;

D. means for moving said workpiece pushers reciprocatively through their said first path of travel in a time relationship with the indexing cycles of said turrets such that workpieces carried in said odd and even-numbered ones of said pockets on said conveyors are loaded by the workpiece pushers into said corresponding first and second chucks of the pairs of chucks positioned at the loading station during each said indexing cycle of said turrets and such that said pushers are returned to their retracted positions prior to the start of each next indexing cycle of the turrets; and E. means for moving said workpiece pushers reciprocatively through their said second path of travel, such movement in the direction of movement of said conveyors being at a velocity substantially equal to that of such conveyors and such movement in the direction opposite to that of said conveyors being at a velocity approximately twice that of the conveyors.

3. An apparatus for high-speed loading of articles such as tubes or rods of substantially identical diameters and lengths into associated pairs of corresponding chucks equally spaced about the outer peripheries of a pair of vertically disposed and spaced apart complemental and cooperative turrets which are intermittently rotatively indexed by a motor means to move said corresponding pairs of chucks through corresponding vertically circular paths of travel each such path comprising a series of stations including an article loading station located in a selected lower quadrant of said circular paths of travel, empty associated adjacent ones of said chucks being located at said loading station for a selected period of time between each indexing movement of said turrets, said apparatus comprising:

A. an endless article conveyor associated with each said turret and movable through corresponding paths of travel each extending in a vertical loop and each including a selected portion extending parallel with lines projected between the centers of each said pair of associated adjacent chucks when such chucks are located at said loading station, each such conveyor including about the outer periphery thereof an endless succession of article conveying pockets provided by longitudinal members extending generally normal to the outer peripheral surface of the respective conveyor with the ends of such members being in close proximity to the outer limits of said circular paths of travel of said chucks when each respective conveyor moves through said selected portion of its path of travel, and each said pocket having a width greater than the diameter of said articles and the centers of adjacent ones of said pockets being spaced from each other a distance generally corresponding to a third of the distance between the centers of adjacent pairs of said chucks;

B. a slide track associated with each said conveyor and extending parallel with said selected portion of the path of travel of the respectively associated conveyor, each such slide track being spaced from its associated conveyor in a direction away from the respectively associated turret;

C. an article-pusher carriage mounted on each said slide track and reciprocatively slidably movable therealong;

D. a pair of article pushers associated with each said pusher carriage each such pair of pushers extending parallel with each other and normal to said selected portion of the path of travel of the respectively associated conveyor with the article contacting ends of said pushers being aligned with each other parallel with said selected portion of said path of travel and with the centers of such ends separated by a distance corresponding to said distance between the centers of adjacent pairs of said chucks, each respective pair of said pushers being slidably mounted on their respective carriage so as to be reciprocatively movable thereon towards and away from the respectively associated turret;

E. means connecting said motor means to said conveyors for continuous and corresponding movement thereof through their respective paths of travel at a velocity such that, at a selected point in time in each of said selected periods of time that empty pairs of said chucks are located at said loading station, odd and even-numbered ones of consecutively numbered ones of said pockets on each conveyor pass said loading station for unloading of such pockets into corresponding first and second ones respectively of each of said empty pairs of chucks;

F. means connecting said motor means to each of said article pusher carriages for imparting reciprocative sliding movement thereto along their respective said slide tracks, such movement in the direction of movement of said conveyors being at a velocity generally equal to that of such conveyors and such movement in the opposite direction being at a velocity approximately twice that of the conveyors; and G. means connecting said motor means to each of said pairs of article pushers for imparting reciprocative sliding movement thereto between projected and retracted positions on their respective carriages such that said pockets when disposed for said unloading into said empty pairs of chucks are so unloaded by projection of said pushers and such pushers are moved towards their said retracted positions prior to each next following indexing of said turrets.

4. Apparatus in accordance with claim 3 and in which the velocity of said conveyors is approximately a third of the average velocity of one indexing cycle of said turrets.